(12) United States Patent
Pawis et al.

(10) Patent No.: US 10,655,608 B2
(45) Date of Patent: May 19, 2020

(54) WIND TURBINE ROTOR BLADE

(71) Applicant: Wobben Properties GmbH, Aurich (DE)

(72) Inventors: Torsten Pawis, Sübrookmerland (DE); Golo Strickmann, Aurich (DE)

(73) Assignee: Wobben Properties GmbH, Aurich (DE)

( * ) Notice: Subject to any disclaimer, the term of this patent is extended or adjusted under 35 U.S.C. 154(b) by 173 days.

(21) Appl. No.: 15/747,396

(22) PCT Filed: Aug. 1, 2016

(86) PCT No.: PCT/EP2016/068286
§ 371 (c)(1),
(2) Date: Jan. 24, 2018

(87) PCT Pub. No.: WO2017/021350
PCT Pub. Date: Feb. 9, 2017

(65) Prior Publication Data
US 2018/0216603 A1 Aug. 2, 2018

(30) Foreign Application Priority Data
Jul. 31, 2015 (DE) .................. 10 2015 112 643

(51) Int. Cl.
F03D 80/40 (2016.01)
F03D 1/06 (2006.01)

(52) U.S. Cl.
CPC .......... F03D 80/40 (2016.05); F03D 1/0633 (2013.01); Y02E 10/721 (2013.01)

(58) Field of Classification Search
CPC ....... F03D 1/0633; F03D 80/40; Y02E 10/721
See application file for complete search history.

(56) References Cited

U.S. PATENT DOCUMENTS 3,885,609 A * 5/1975 Frei .................. F01D 5/187
416/97 R
4,474,532 A * 10/1984 Pazder .................. F01D 5/187
415/115
4,604,031 A * 8/1986 Moss ...................... F01D 5/187
415/115

(Continued)

FOREIGN PATENT DOCUMENTS

CN  1727673 A  2/2006
CN  101029624 A  9/2007

(Continued)

Primary Examiner — Kenneth J Hansen
Assistant Examiner — Andrew J Marien
(74) Attorney, Agent, or Firm — Seed Intellectual Property Law Group LLP

(57) ABSTRACT

There is provided a wind turbine rotor blade comprising a rotor blade root region, a rotor blade tip region, a pressure side, a suction side, at least one fin which extends along a longitudinal direction of the rotor blade and at least one deflection unit between an end of the at least one fin and the rotor blade tip region. The at least one deflection unit is adapted to deflect an air flow which is propagated along the at least one fin. In addition there is provided at least one fin drop-shaped portion arranged in the region of the at least one fin to reduce turbulence in the air upon deflection.

9 Claims, 4 Drawing Sheets

(56) References Cited

U.S. PATENT DOCUMENTS

| | | | | |
|---|---|---|---|---|
| 5,073,086 A * | 12/1991 | Cooper | ............... | F01D 5/187 416/96 R |
| 5,498,126 A * | 3/1996 | Pighetti | ............... | F01D 5/187 415/115 |
| 6,227,804 B1 * | 5/2001 | Koga | ............... | F01D 5/187 415/115 |
| 6,595,750 B2 * | 7/2003 | Parneix | ............... | F01D 5/187 416/97 R |
| 6,939,102 B2 * | 9/2005 | Liang | ............... | F01D 5/188 415/115 |
| 6,957,949 B2 * | 10/2005 | Hyde | ............... | F01D 5/187 416/96 R |
| 7,137,784 B2 * | 11/2006 | Hall | ............... | F01D 5/187 416/97 R |
| 7,914,259 B2 | 3/2011 | Godsk | | |
| 8,029,239 B2 * | 10/2011 | Luetze | ............... | F03D 15/05 416/91 |
| 8,807,945 B2 * | 8/2014 | Spangler | ............... | F01D 5/187 416/97 R |
| 8,985,940 B2 * | 3/2015 | Zhang | ............... | F01D 5/081 415/115 |
| 9,169,830 B2 * | 10/2015 | Weitkamp | ............... | F03D 1/0675 |
| 9,518,468 B2 * | 12/2016 | Tibbott | ............... | F01D 5/186 |
| 9,828,972 B2 * | 11/2017 | Cuoghi | ............... | F03D 1/0675 |
| 2006/0018752 A1 | 1/2006 | LeMieux | | |
| 2014/0322027 A1 | 10/2014 | Lenschow | | |

FOREIGN PATENT DOCUMENTS

| | | |
|---|---|---|
| CN | 101680423 A | 3/2010 |
| CN | 201437756 U | 4/2010 |
| DE | 19528862 A1 | 2/1997 |
| DE | 20014238 U1 | 7/2001 |
| DE | 102005034131 A1 | 2/2006 |
| DE | 102010051297 A1 | 5/2012 |
| DE | 102011086603 A1 | 5/2013 |
| JP | 61-89901 A | 5/1986 |
| JP | 2014-218944 A | 11/2014 |
| JP | 2014-533792 A | 12/2014 |

\* cited by examiner

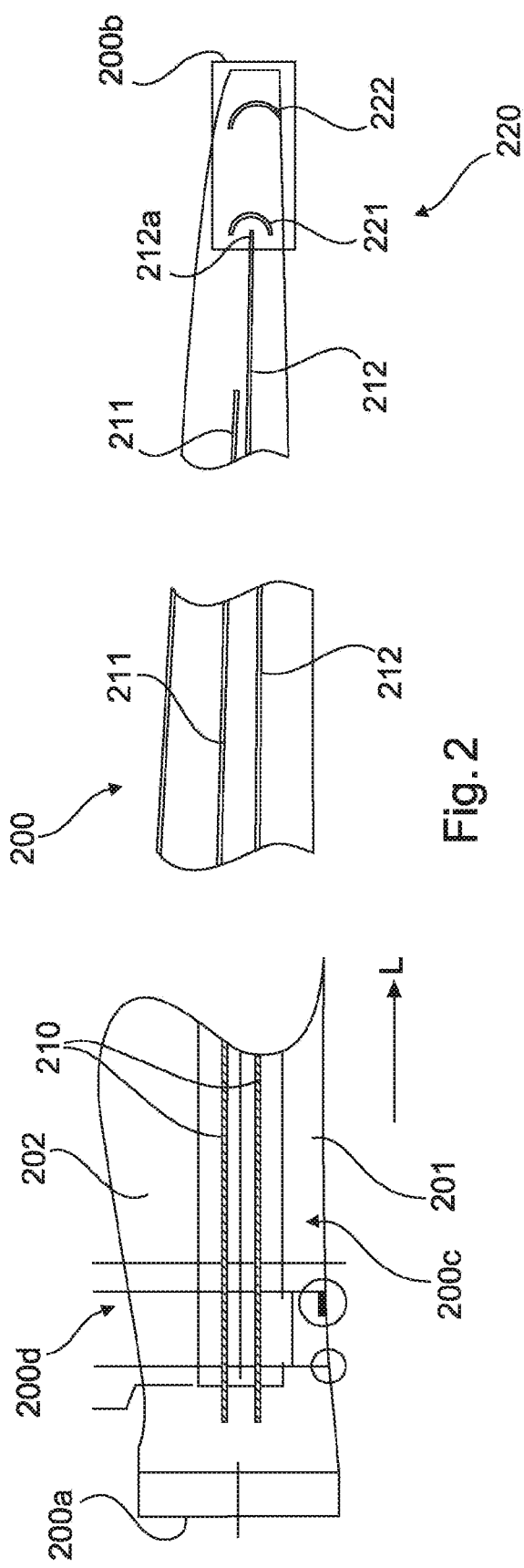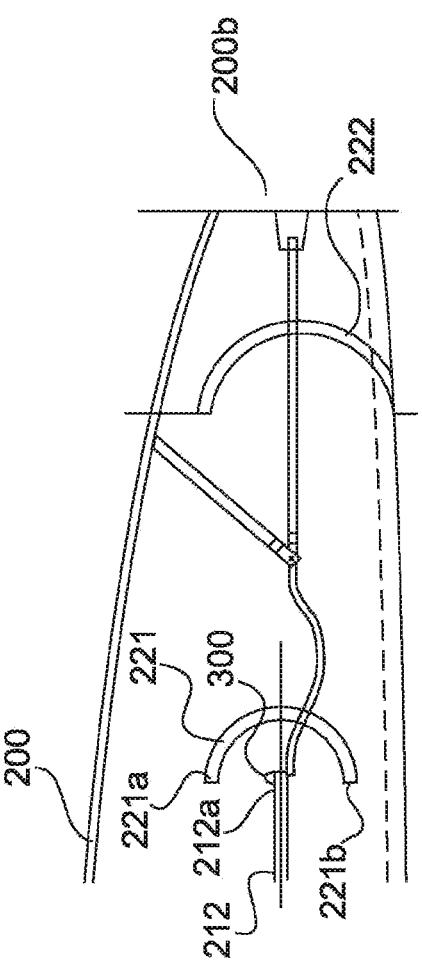

WIND TURBINE ROTOR BLADE

BACKGROUND

Technical Field

The present invention concerns a wind turbine rotor blade and a wind turbine having a corresponding rotor blade.

Description of the Related Art

As the rotor blades of a wind turbine are unprotectedly exposed to all weather conditions icing of the rotor blades can occur at certain temperatures. A rotor blade heating system can be used to prevent that. In that case either heating can be provided externally on the rotor blade or warmed air can be provided within the rotor blade.

On the German patent application from which priority is claimed the German Patent and Trade Mark Office searched the following documents: DE 200 14 238 U1, DE 10 2010 051 297 A1, DE 10 2011 086 603 A1, DE 10 2005 034 131 A1 and DE 195 28 862 A1.

BRIEF SUMMARY

Provided is a wind turbine rotor blade which permits improved heating of the rotor blade.

Provided is a wind turbine rotor blade comprising a rotor blade root region, a rotor blade tip region, a pressure side, a suction side, at least one fin which extends along a longitudinal direction of the rotor blade and at least one deflection unit between an end of the at least one fin and the rotor blade tip region. The at least one deflection unit is adapted to deflect an air flow which is propagated along the at least one fin.

According to an aspect of the present invention a first deflection unit is provided in the region of an end of the first fin.

According to a further aspect of the present invention a second deflection unit is provided between the first deflection unit and the rotor blade tip.

According to a further aspect of the present invention the first deflection unit has a first and a second end and is of a round or elliptical configuration. An end of the first or second fin projects beyond the first and second end into the deflection unit.

According to a further aspect of the present invention a drop-shaped portion is provided at an end of the first or second fin.

According to a further aspect of the present invention a deflection unit is provided in the region of an end of the first fin and a second deflection unit is provided between the end of the second fin and the rotor blade tip.

Provided in the interior of a wind turbine rotor blade in the region of the rotor blade tip is a deflection unit in the region of an end of a fin of the rotor blade and/or a deflection unit in the region of the rotor blade tip. Provided in the rotor blade is at least one fin which extends from the region of the rotor blade root in the direction of the rotor blade tip without in that respect reaching the rotor blade tip. Warmed air can flow along the fin in the direction of the rotor blade tip and can be directed or deflected in the direction of the rotor blade root again by the deflection means.

According to an aspect of the present invention the deflection unit is in the form of a deflection plate. A main part of the air flow can be put into a uniform configuration by a guide means which is round or portion-wise ellipsoidal. The deflection plate can for example be made of foam. Alternatively or additionally thereto fin drop-shaped portions can be provided whereby an additional volume can be introduced to avoid steep pressure gradients in the flow direction.

In addition or alternatively thereto a flow feed guide can be provided. This can be effected for example by positioning a partition or the fins in such a way that the intake flows (the warmed air) are combined in the flow convergence guide in parallel and at the same speed.

Additionally or alternatively thereto it is possible to provide a deflection element which has a change in cross-sectional area that is as slight as possible.

Further embodiments of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

FIG. 2 shows a diagrammatic view of a portion of a rotor blade of the wind turbine of FIG. 1, FIG. 3 shows a portion of the rotor blade of FIG. 2, FIGS. 4A-4C show various views of a fin drop-shaped portion.

DETAILED DESCRIPTION

Figure 1:
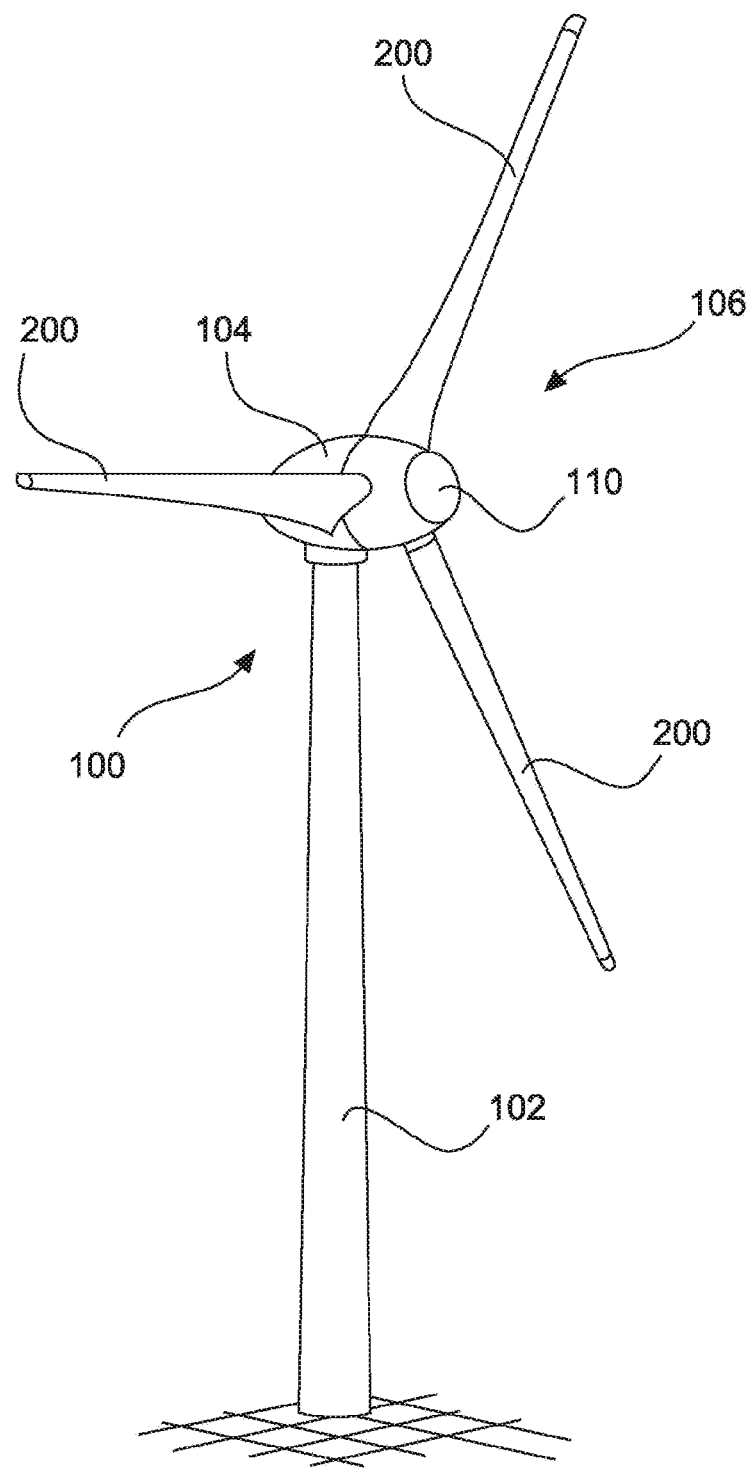
FIG. 1 shows a diagrammatic view of a wind turbine according to the invention.

FIG. 1 shows a diagrammatic view of a wind turbine according to the invention. The wind turbine 100 has a tower 102 and a pod 104 on the tower 102. Provided on the pod 104 is an aerodynamic rotor 106 having three rotor blades 200 and a spinner 110. The aerodynamic rotor 106 is caused to rotate by the wind in operation of the wind turbine and thus also rotates a rotor or rotor member of a generator coupled directly or indirectly to the aerodynamic rotor 106. The electric generator is arranged in the pod 104 and generates electrical energy. The pitch angle of the rotor blades 200 can be altered by pitch motors at the rotor blade roots of the respective rotor blades 200.

FIG. 2 shows a diagrammatic view of a portion of a rotor blade of the wind turbine of FIG. 1. The rotor blade 200 has a rotor blade root region 200a, a rotor blade tip region 200b, a leading edge 201, a trailing edge 202, a pressure side 200c and a suction side 200d. At least one fin 210 extends within the rotor blade along a longitudinal direction of the rotor blade 200. For example there can be two fins 211, 212 which can initially be parallel and can be of a mutually converging configuration in the region of the rotor blade tip 200b. In that respect the length of the first fin 211 can be less than the length of the second fin 212. A first deflection unit 221 can be provided in the region of an end 212a of the second fin 212. A second deflection unit 222 can be provided in the region of the tip 200b of the rotor blade.

Warmed air can be guided along the fins in the direction of the rotor blade tip and then deflected by the deflection units.

FIG. 3 shows a portion of the rotor blade of FIG. 2. FIG. 3 shows the rotor blade tip region 200b of the rotor blade 200. In particular an end 212a of the fin 212 and the first and second deflection units 221, 222 are shown here.

The first deflection unit 221, the second deflection unit 222 or both deflection units 221, 222 can be provided.

Optionally the first deflection unit 221 can be of a round or elliptical configuration and can have two ends 221a, 221b, wherein the end 212a of the fin 212 projects beyond the first and second ends 221a, 221b into the deflection unit 221. That can ensure that the air flow is effectively deflected by the first deflection unit 221. In that respect it is possible to achieve in particular a uniform configuration in respect of the main part of the flow.

According to an aspect of the present invention fin drop-shaped portions 300 can be provided at the fin end.

As can be seen from FIG. 2 the spacing between the first and second fins 211, 212 reduces in the direction of the rotor blade tip 200b. Flow convergence can be achieved in that way. In particular the intake flows can combine when the flows are brought together in parallel relationship and at the same speed.

Figure 4A:
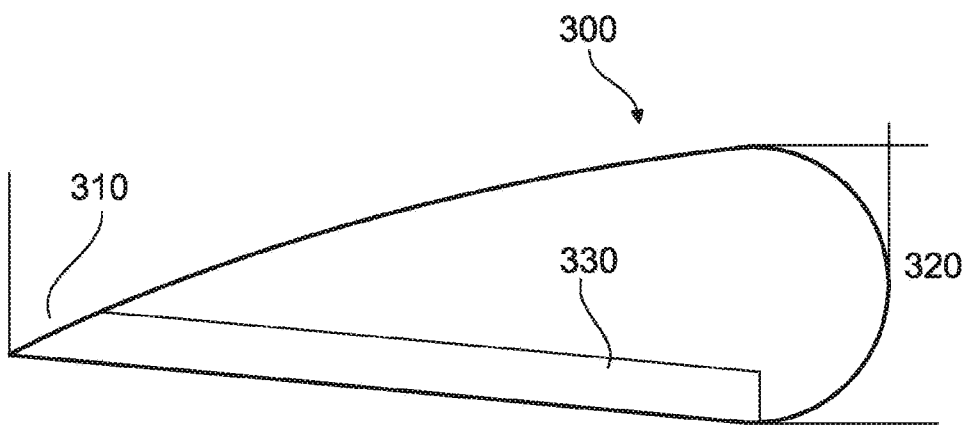
Figure 4B:
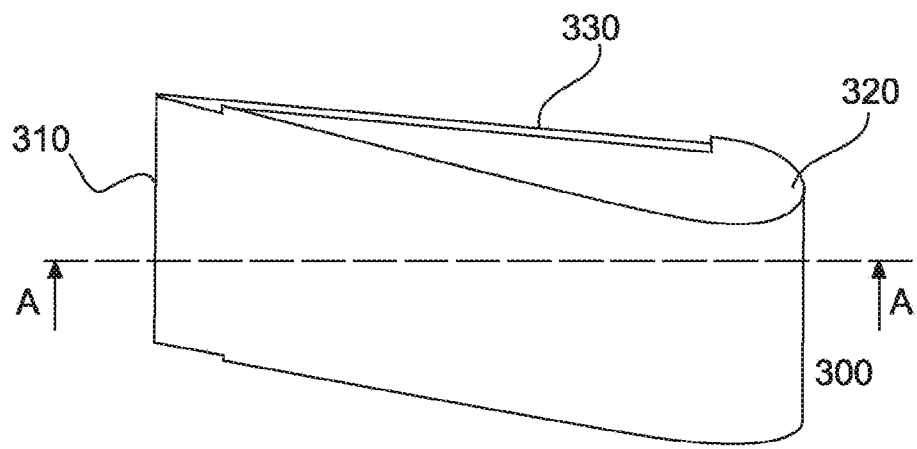
Figure 4C:
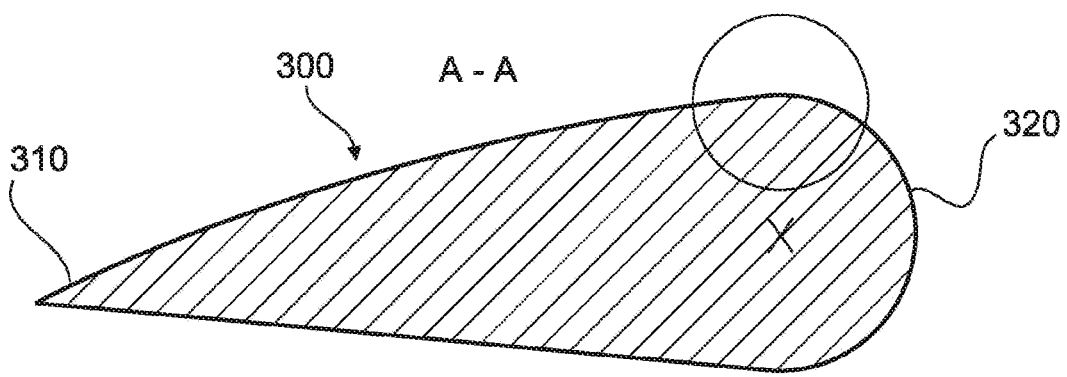

FIGS. 4A-4C show various views of a fin drop-shaped portion. FIG. 4A is a plan view of a fin drop-shaped portion 300, FIG. 4B shows a perspective view of the fin drop-shaped portion 300 and FIG. 4C is a sectional view along line A-A in FIG. 4B. The fin drop-shaped portion 300 is provided or glued at a fin end as shown in FIG. 3. That fin drop-shaped portion is intended to improve deflection of the warmed air in the region of the rotor blade nose and in the region of the rotor blade rear box structure. The warmed air is deflected and flows for example in the region between the fins back to the rotor blade root.

The fin drop-shaped portion 300 can be arranged laterally at a fin end.

The drop-shaped portion 300 has a first end 310, a second end 320 and optionally a recess 330 at the side surfaces of the drop-shaped portion. The first end 310 is of a pointed configuration while the second end 320 is of a round configuration.

Figure 5:
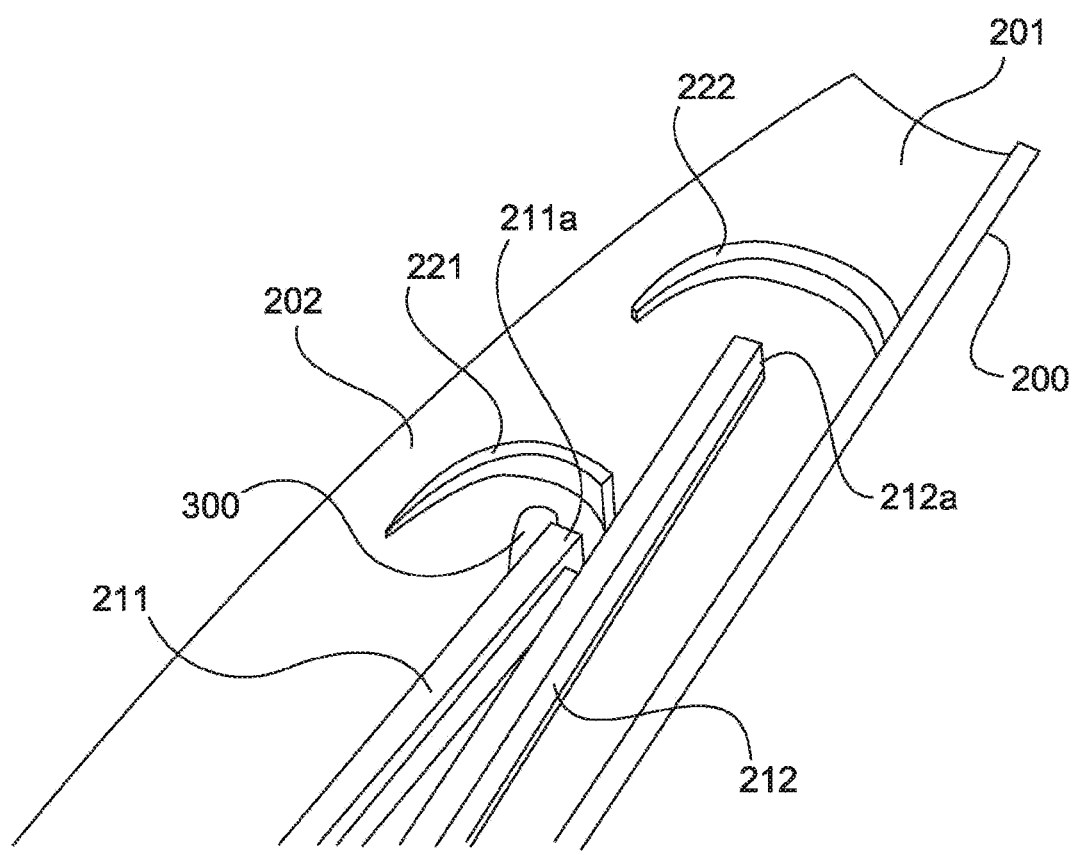
FIG. 5 shows a diagrammatic perspective view of a portion of a wind turbine rotor blade.

FIG. 5 shows a diagrammatic perspective view of a portion of a wind turbine rotor blade. The rotor blade 200 has a first and second fin 211, 212, a first and second deflection unit 221, 222 and a fin drop-shaped portion 300 at an end 211a of the first fin 211. The first deflection unit 221 is provided in the region of the end 211a of the first fin 211 while the second deflection unit 222 is provided in the region of the end 212a of the second fin 212. The fin drop-shaped portion 300 is provided laterally on the first fin 211. A fin drop-shaped portion 300 can be also be provided at the end 212a of the second fin 212.

The fin drop-shaped portion 300 can also be provided at other locations along the fins (for example in the center). The deflection unit can be made for example from foam and forces the main part of the air flow into a uniform configuration. The fin drop-shaped portion serves as an additional volume for avoiding severe pressure gradients in the flow direction. In addition the fin drop-shaped portions serve to round off the corners.

The invention claimed is:

1. A wind turbine rotor blade comprising:
   a rotor blade root region,
   a rotor blade tip region,
   a pressure side,
   a suction side,
   a leading edge,
   a trailing edge,
   at least one fin extending along a longitudinal direction of the rotor blade, the at least one fin being configured to propagate air flow,
   at least one fin drop-shaped portion arranged in a region of the at least one fin to reduce turbulence of the air flow, wherein the at least one fin drop-shaped portion has a first end, a second end, a side surface, and a recess at the side surface, wherein the first end is of a pointed configuration and the second end is of a round configuration, and
   at least one deflection unit between an end of the at least one fin and the rotor blade tip region,
   wherein the at least one first deflection unit is adapted to deflect the air flow.

2. The wind turbine rotor blade according to claim 1 wherein the at least one deflection unit is a first deflection unit arranged in a region of an end of at least one fin.

3. The wind turbine rotor blade according to claim 2 further comprising a second deflection unit provided between the first deflection unit and the rotor blade tip.

4. The wind turbine rotor blade according to claim 3 wherein the first deflection unit has a first end and a second end and is of a round or elliptical configuration, and wherein the end of the at least one fin projects beyond the first and second end of the first deflection unit towards the second deflection unit.

5. The wind turbine rotor blade according to claim 3 wherein the at least one fin is a first fin, the wind turbine rotor blade including a second fin, wherein the first deflection unit is provided in the region of the end of the first fin and the second deflection unit is provided between an end of the second fin and the rotor blade tip region.

6. The wind turbine rotor blade according to claim 1 wherein the at least one fin is a first fin, the wind turbine rotor blade including a second fin, wherein the recess is provided laterally on the at least one fin drop-shaped portion, and wherein the at least one fin drop-shaped portion is provided laterally on the first fin the fin drop-shaped portion is provided laterally at the end of the second fin.

7. The wind turbine rotor blade according to claim 1 wherein the at least one fin drop-shaped portion is arranged at an end of at least one fin, wherein the end is towards the rotor blade tip region.

8. A method comprising:
   heating a wind turbine rotor blade that has a rotor blade root region, a rotor blade tip region, a pressure side, a suction side, a leading edge, a trailing edge, a first fin and a second fin, the first fin and the second fin extending along a longitudinal direction of the rotor blade, and at least one fin drop-shaped portion arranged in a region of the first fin to reduce turbulence in air upon deflection, wherein the at least one fin drop-shaped portion has a first end, a second end, a side surface, and a recess at the side surface, wherein the first end is of a pointed configuration and the second end is of a round configuration, wherein heating comprises introducing warmed air along at least one of the leading edge and the trailing edge, and
   deflecting the warmed air.

9. The method according to claim 8 wherein deflecting comprises deflecting the warmed air into a region between the first and second fins.

\* \* \* \* \*